United States Patent [19]

Kongsgaarden

[11] 4,126,423
[45] Nov. 21, 1978

[54] METHOD OF INCREASING THE BULK DENSITY OF SILICA DUST

[75] Inventor: Ole A. Kongsgaarden, Vagsbygd, Norway

[73] Assignee: Elkem-Spigerverket A/S, Olso, Norway

[21] Appl. No.: 791,603

[22] Filed: Apr. 27, 1977

[30] Foreign Application Priority Data

Apr. 27, 1976 [NO] Norway ................................ 761434

[51] Int. Cl.² .......................... B01J 2/12; C01B 33/12
[52] U.S. Cl. ................................ 23/293 R; 23/313 R; 23/313 AS
[58] Field of Search .......... 23/313 AS, 313 R, 293 R, 23/293 A, 313 FB; 423/336, 337, 335; 252/317; 264/117

[56] References Cited

U.S. PATENT DOCUMENTS

| | | | |
|---|---|---|---|
| 1,684,006 | 9/1928 | Bent | 23/313 |
| 2,411,873 | 12/1946 | Firth | 23/313 |
| 3,532,473 | 10/1970 | Biegler | 23/313 AS |
| 3,538,212 | 11/1970 | Beau | 264/117 |
| 3,560,151 | 2/1971 | Vogt | 423/337 |
| 3,645,684 | 2/1972 | Cuir | 423/336 |
| 3,832,434 | 8/1974 | Flood | 264/117 |

OTHER PUBLICATIONS

Chem. Abs., vol. 51, 1957, col. 10, 210d, e (Hirata et al.).

*Primary Examiner*—Stephen J. Emery
*Attorney, Agent, or Firm*—Eyre, Mann, Lucas & Just

[57] ABSTRACT

A method of increasing the bulk density of silica dust is disclosed. The silica dust is treated in a drum preferably having internal ribs whereby its bulk density is substantially increased.

7 Claims, 1 Drawing Figure

U.S. Patent  Nov. 21, 1978  4,126,423
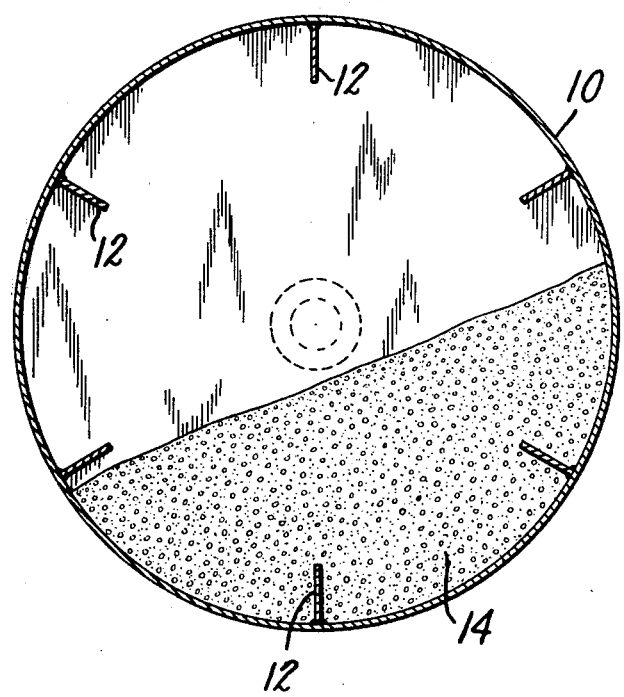

METHOD OF INCREASING THE BULK DENSITY OF SILICA DUST

The present invention relates to the waterless treatment of silica dust to increase its bulk density.

In the production of materials having a high silicon content such as silicon, ferrosilicon, silicon carbide and other silicon-containing alloys in smelting furnaces, there is generated a great deal of silicon monoxide which is converted to silicon dioxide. The silicon dioxide is in a very fine form and it is normally referred to as colloidal silica.

Because of the very light nature of this dust, it does not remain in the smelting process but rather is carried up with the off gasses from the smelting process into the furnace flue. Because escaping dust would be an environmental pollutant, it is necessary that the dust be recovered from the smoke from the smelting furnace. Typical dry methods employed in this regard involve bag house filters and the like.

The very fine dust recovered which has a typical weight by volume of 150–200 kg/m$^3$ must then be disposed of. Various utilities for these dusts are known such as in refractory ceramics, as a filler in building materials and rubber and as an anti-caking material for fertilizers. When the material is used in these particular applications, it is, of course, usually necessary to transport it to the end user. Because the colloidal silica dust is so light and powdery, transportation costs are inordinately high.

There have in the past been methods for increasing the bulk density of the silica by the addition of water. One such treatment is disclosed in U.S. Pat. No. 3,832,434. While this method is very effective, there are instances where the addition of water is detrimental. For example, there are applications where water will interfere with the particular application and the nodules must therefore be dried before they can be used, an additional process step which is undesirable both in terms of economics and energy considerations. Furthermore, when colloidal silica dust is combined with water to increase its bulk density, the very fine colloidal silica dust assumes a different form and it has been found to be virtually impossible to return the material to its original colloidal silica state, a state which is beneficial in a number of applications.

In accordance with the present invention, there is disclosed a method of compacting silica dust and thereby increasing the weight per unit volume of the material without the need for water. The dust is charged to a drum having closed ends and is tumbled therein. The drum preferably has internal ribs which are transverse to the direction of rotation of the drum. When the silica dust is treated in accordance with the present invention, it has been found that the bulk density of the dust can be increased by up to 300% or more.

An apparatus suitable for use in the present invention is shown in cross section in the drawing. The apparatus comprises a drum 10 which preferably has ribs 12 therein. The drum is preferably closed on both of its ends. The diameter of the drum is not of consequence, except that the speed of rotation should be kept at about 75% of the critical value for the chosen diameter. The critical speed is reached when the centrifugal force on a particle at the drum shell at the height of its path equals the force due to gravity. The length is of no great consequence and can be from about 1 to about 5 times greater than the diameter of the drum, suitably 2–3 times; it being understood that the length will be substantially greater where a continuous process is employed. The height of the ribs 12 is suitably from about 5 to about 15% of the diameter, using lower values for increasing diameter and increasing number of ribs. There should be at least four ribs. It has been found that the larger diameter drums are more effective for treatment in accordance with the present invention than the smaller diameter drums. The amount of silica dust 14 charged to the drum is typically about 25% by volume of the drum but may range up to 60% as desired. The time of treatment in the drum is typically at least about 5 hours. The increase in density is gradual, approaching its maximum value after 5 to 10 hours. The time necessary may be shortened by using a minor part of already compacted material in the charge.

In one specific test, silica dust having a bulk density of about 200 kg/m$^3$ was charged to a drum having a diameter of 100 cm. The drum was fitted with 4 internal ribs having a height of 10 cm. The silica dust filled about 25% of the volume of the drum.

The drum was rotated at a speed of about 265 rpm for 20 hours and the bulk density of the treated silica dust was increased to about 680 kg/m$^3$, an increase of over 300%. The treated material was very uniform and consisted of round and almost equally sized balls of about 0.5 mm diameter.

The test was repeated except that the time of treatment was reduced to ten hours. In this instance, the bulk density was increased to about 600 kg/m$^3$ and the balls formed, while not as uniform, were somewhat larger than those formed in the twenty hour treatment.

It will be understood that various changes can be made within the concept of the present invention. For example, the drum could be made of octagonal rather than circular cross-section and the same beneficial effects could be obtained as are obtained by the addition of ribs. Similarly, the process could be made continuous by using a very long, gently inclined drum whereby dust could be continuously introduced at the high end, treated throughout the length of the drum and continuously discharged at a higher bulk density at the lower end of the drum.

It will therefore be understood that the claims are intended to cover all changes and modifications of the preferred embodiment of the invention, herein chosen for the purpose of illustration, which do not constitute departure from the spirit and scope of the invention.

What is claimed is:

1. A reversible waterless process for increasing the bulk density of that colloidal silica dust recovered from metallurgical smelting processes producing materials high in silicon content comprising charging the silica dust to a drum having means to produce tumbling and treating the silica dust in the enclosed drum by rotating the drum at less than the critical speed for a period of at least about 5 hours.

2. The process of claim 1 wherein the rotational speed of the drum is about 75% of the critical speed.

3. The process of claim 1 wherein the drum is provided with a plurality of internal ribs.

4. The process of claim 3 wherein each said rib has a height of from about 5% to about 15% of the diameter of the drum.

5. The process of claim 5 wherein there are at least four ribs.

6. The process of claim 1 wherein the increase in bulk density is at least three times.

7. A reversible waterless process for increasing the bulk density of that colloidal silica dust recovered from metallurgical smelting processes producing materials high in silicon content comprising charging the silica dust to a drum, said drum having at least four internal ribs, rotating the drum for at least about 5 hours at a speed of about 75% of the critical speed.

* * * * *